United States Patent
Chen et al.

(10) Patent No.: US 10,138,325 B2
(45) Date of Patent: Nov. 27, 2018

(54) POLYPHENOLIC CONDENSATES AND EPOXY RESINS THEREOF

(71) Applicant: Chang Chun Plastics Co., Ltd., Taipei (TW)

(72) Inventors: Yu-Jen Chen, Taipei (TW);
Sung-Kuang Chung, Taipei (TW);
Chang-Lin Hung, Taipei (TW);
An-Pang Tu, Taipei (TW); Kuen-Yuan Hwang, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 0 days.

(21) Appl. No.: 15/581,171

(22) Filed: Apr. 28, 2017

(65) Prior Publication Data

US 2017/0327629 A1     Nov. 16, 2017

Related U.S. Application Data

(60) Provisional application No. 62/335,425, filed on May 12, 2016.

(51) Int. Cl.
| | | |
|---|---|---|
| *C08G 8/04* | (2006.01) | |
| *C08G 59/08* | (2006.01) | |
| *C08G 14/12* | (2006.01) | |
| *C08G 59/18* | (2006.01) | |
| *C08G 59/32* | (2006.01) | |
| *C08G 59/62* | (2006.01) | |
| *C08L 61/14* | (2006.01) | |
| *C08L 63/00* | (2006.01) | |
| *C08G 8/36* | (2006.01) | |

(52) U.S. Cl.
CPC ............ *C08G 59/08* (2013.01); *C08G 8/04* (2013.01); *C08G 8/36* (2013.01); *C08G 14/12* (2013.01); *C08G 59/186* (2013.01); *C08G 59/3218* (2013.01); *C08G 59/625* (2013.01); *C08L 61/14* (2013.01); *C08L 63/00* (2013.01)

(58) Field of Classification Search
CPC .... C08G 59/08; C08G 59/625; C08G 59/186; C08G 59/3218; C08G 8/04; C08G 14/12; C08L 63/00; C08L 61/14
See application file for complete search history.

(56) References Cited

U.S. PATENT DOCUMENTS 6,201,094 B1 *   3/2001   Gerber ................. B32B 5/32
                                                 525/133

\* cited by examiner

*Primary Examiner* — Shane Fang
(74) *Attorney, Agent, or Firm* — Nixon Peabody LLP; Thomas P. Pavelko (57) ABSTRACT

Polyphenolic condensates and epoxidized products prepared from said condensates are prepared by a reaction utilizing multi catalysts to control the weight average molecular weight (Mw) and the number average molecular weight (Mn). Improved color and ultraviolet absorbance are possessed by the condensates described herein.

20 Claims, 6 Drawing Sheets

POLYPHENOLIC CONDENSATES AND EPOXY RESINS THEREOF

CROSS-REFERENCE TO RELATED APPLICATIONS

This application is a Non-Provisional application claiming the benefit of U.S. Provisional application Ser. No. 62/335,425, filed May 12, 2016, under 35 U.S.C. § 119 (e), the entire contents of which are herein incorporated by reference.

BACKGROUND OF THE INVENTION

1. Field of the Invention

Polyphenolic condensation products (namely polyphenolic condensates or PNX), epoxidized products thereof (namely multi-functional epoxy resins or MFE), their process of manufacture, and their applications are disclosed. It is an aim of the embodiments of the instant disclosure to reduce Color (Gardner Index) and to increase ultraviolet (UV) absorbance (340-370 nm, especially 350 nm and 365 nm) of PNX (mixture) and MFE (mixture), which are used in electrical laminates, such as copper clad laminate (CCL) or printed circuit board (PCB) as a UV blocker for photolithographic processes.

2. Description of the Related Art

Polyphenolic condensation reactions are described in U.S. Pat. Nos. 5,012,016; 6,001,950; 6,140,421; 6,232,399; 6,316,583; 6,201,094; 6,239,248; 6,379,800; and 6,608,161 and United States Published Application 20110098380. Commercial polyphenolic condensation products (PNX) are available under the trademark/tradename Durite SD-357B from Hexion (Borden Chemical) and TPN1 from Nan Ya Plastics. Epoxidization reactions are described in U.S. Pat. No. 6,201,094 (Example 8) and U.S. Pat. No. 6,001,873. Commercial multi-functional epoxy resins (MFE) are available under the trademark/tradename EPON 1031(A70) from Hexion (Borden Chemical); XB-4399 from Huntsman; 1031 (A70) from Shell; TNE190A70 from Chang Chun Plastics. Applications of PNX and/or MFE in flame retarding compositions are described in United States Published Application US 20080064792, U.S. Pat. No. 7,662,902 and PCT application WO2016141257. The disclosures of the above referenced patents and publications are herein incorporated by reference.

Figure 1:
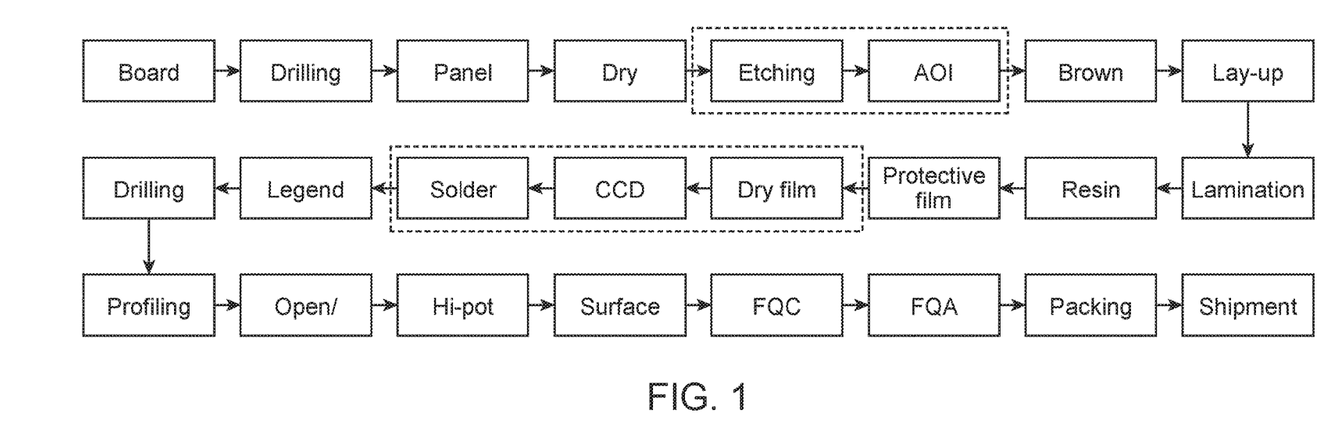
FIG. 1 is a schematic representation of the overall process of forming PCB.
Figure 2A:
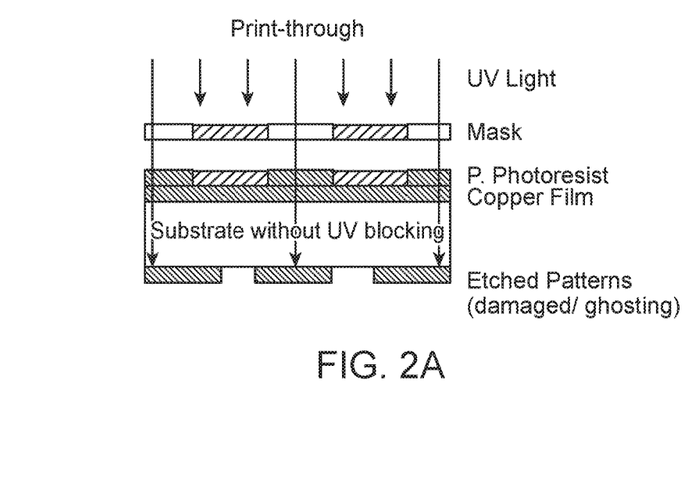
FIG. 2A is a schematic representation of the print-through that occurs in a substrate without sufficient UV blocking.
Figure 2B:
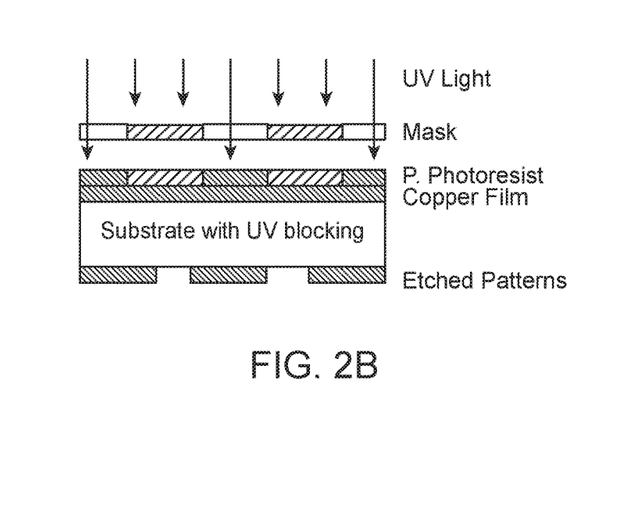
FIG. 2B is a schematic representation of a substrate with UV blocking.

A typical multilayer PCB process can be illustratively found in FIG. 1. PNX and/or MFE provide not only good thermal properties, but also good optical properties. The high UV absorbance (340-370 nm) avoids a possible damage on the other side of the PCB (Compare FIG. 2A with FIG. 2B) during the photolithographic process, especially for thin-layer or multilayer circuit boards.

It has been found that the PNX and the MFE produced therefrom are high in UV absorbance, but they are too dark in color for visual-light or UV-light AOI system, resulting in low recognition of printed circuit from epoxy resin substrate. In another aspect, some products are light in color, but too low in UV absorption/blocking for PCB etching process, resulting in ghosting images printing through from the UV light applied through a mask during PCB production. It is difficult to produce PNX and MFE produced therefrom with properties of light color and high UV absorbance.

Thus, there exists a need for improved polyphenolic condensation products (PNX) and multi-functional epoxy resins (MFE) produced therefrom for use in PCB production as well as AOI system.

SUMMARY OF THE INVENTION

The polyphenolic condensates of the instant disclosures typically have weight average molecular weight (Mw) and the Mw relationship to number average molecular weight (Mn) satisfies the expression Mw/Mn=about 1.1 to about 1.4, preferably about 1.1 to about 1.3, are disclosed.

More specifically, the polyphenolic condensates have a GPC integrated area of a range of the weight average molecular weight (Mw) being from 1.3×[1×(Molecular weight of aldehydes)+2×(Molecular weight of phenolic compounds)−2×(Molecular weight of water)] to 1.5×[3× (Molecular weight of aldehydes)+3×(Molecular weight of phenolic compounds)−2×(Molecular weight of water)] of overall GPC integrated area at a detection wavelength of 254 nm.

Furthermore, a process for the production of polyphenolic condensates utilizing multi catalysts is described.

Novel multi-functional epoxy resins are made from the forgoing condensates. In one embodiment multi-functional epoxy resins are described having the Mw/Mn=about 1.3 to about 1.7, preferably about 1.3 to about 1.5, and the GPC integrated area of a range of the weight average molecular weight (Mw) being from 1.3×[1×(Molecular weight of aldehydes)+2×(Molecular weight of phenolic compounds)−2× (Molecular weight of water)] to 1.5×[3×(Molecular weight of aldehydes)+3×(Molecular weight of phenolic compounds)−2×(Molecular weight of water)+168] of overall GPC integrated area at a detection wavelength of 254 nm are disclosed. Laminates, flame retardant compositions and flame retardant products are made from the multi-functional epoxy resins are disclosed herein.

These and other embodiments of the instant disclosure are better understood in connection with the detailed description of the preferred embodiments and the appended drawings.

BRIEF DESCRIPTION OF THE DRAWINGS

Implementations of the present technology will now be described, by way of example only, with reference to the attached figures, wherein.

It should be understood that the various aspects are not limited to the arrangements and instrumentality shown in the drawings.

DETAILED DESCRIPTION OF THE PREFERRED EMBODIMENTS

Figure 5:
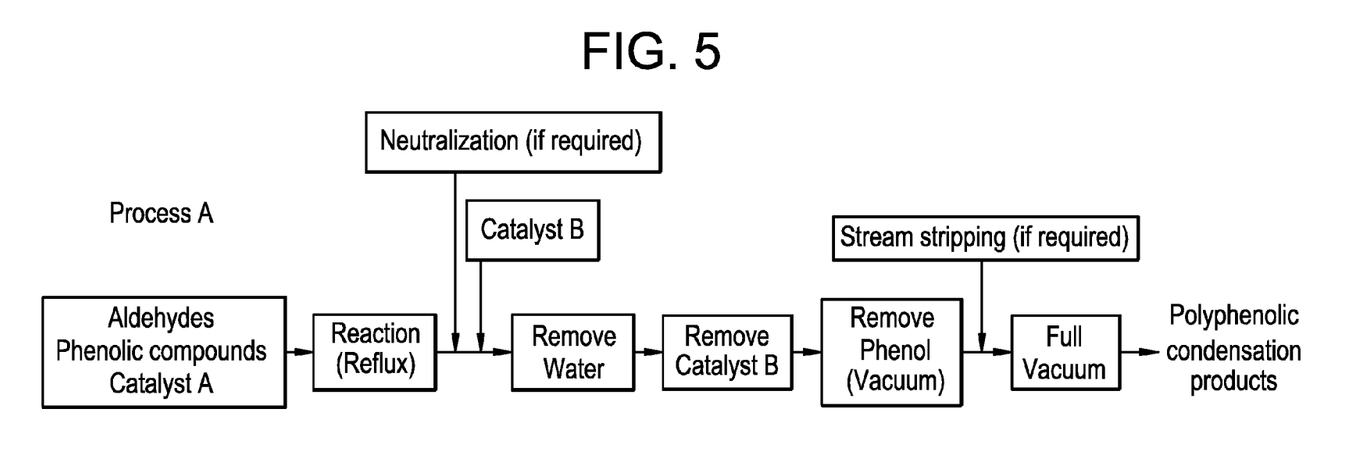
FIG. 5 is a schematic representation of a first multi-catalyst system ("Process A") for preparing polyphenolic condensation products; and, FIG. 6 is a schematic representation of another multi-catalyst system ("Process B") for preparing polyphenolic condensation products.
Figure 6:
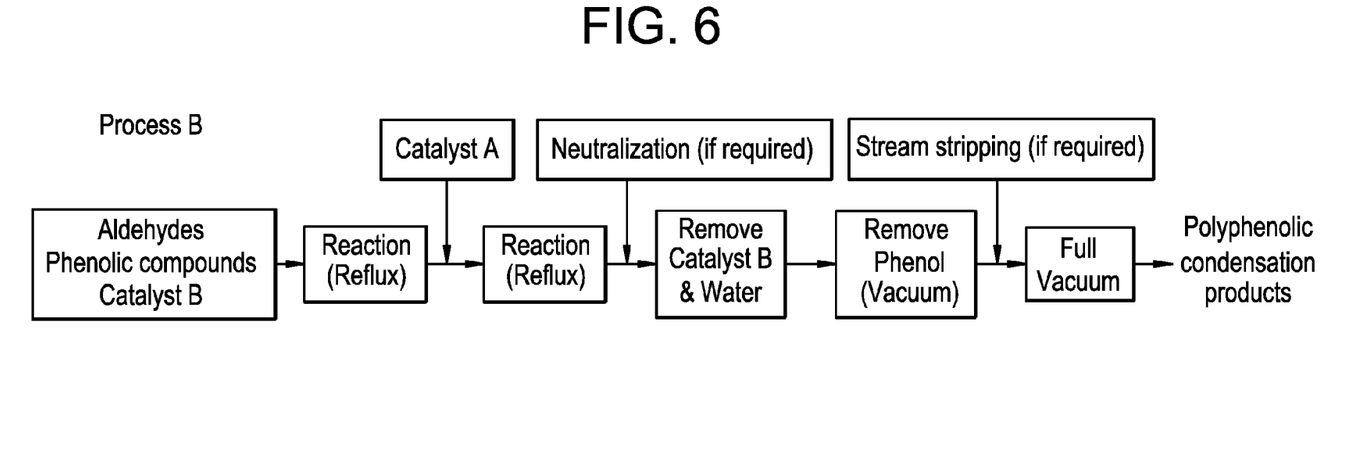

A multi-catalyst system for preparing polyphenolic condensation products can be found in the following schema depicted in FIGS. 5 and 6 (wherein "Process A" of FIG. 5 is preferred over "Process B" of FIG. 6).

Catalyst A is more acidic than Catalyst B, and Catalyst A usually requires a base for neutralization, while Catalyst B can be removed by thermal-decomposition or distillation, except for $H_3PO_4$. The neutralization can occur with NaOH, $NaHCO_3$, $Na_2CO_3$, KOH, $K_2CO_3$, $Ca(OH)_2$, $CaCO_3$ or similar agents in aqueous or solid form.

The pKa value of Catalyst A used in "Process A" or "Process B" is not more than about 1.0 and may be, for example, HCl, $H_2SO_4$, Trifluoroacetic acid, p-Toluenesulfonic acid (PTSA), cation exchange resin, and their mixture (the last four being preferred, especially PTSA).

The pKa value of Catalyst B used in "Process A" or "Process B" is within the range of about 1.0 to about 5.0 and may be, for example, $H_3PO_4$, acetic acid, citric acid, glycolic acid, lactic acid, malonic acid, oxalic acid (OXA), succinic acid, maleic acid, salicylic acid, fumaric acid and their mixture. In some cases, the catalyst is maleic acid, glycolic acid and oxalic acid. In other cases, the catalyst is oxalic acid. A more detailed explanation of the procedure will be found below in connection with the Examples.

The phenolic compounds in the instant disclosure can be represented by the formula:

in which each R is a substituent and n is an integer from 0 to 4. When n is from 1 to 4, substituents R are the same or different and are selected from C1 to C16 alkylated substituents containing none or more functional groups, including alkenyl, alkenyloxy, alkoxy, alkyl, amide, amino, aralkyl, aralkyloxy, aryl, aryloxy, carbonyl, carboxylic, cyano, cycloalkyl, halogen, hydroxyl, isocyano, nitro, phosphine oxide, sulfinyl, sulfonyl and sulfoxide. The C1 to C16 alkylated substituents can be linear, branched, cyclic form, or aromatic rings. Useful phenolic compounds include, for example, phenol, o-methylphenol, m-methylphenol, p-methylphenol, para-tert-butyl-phenol, p-octylphenol, p-phenylphenol, p-cumylphenol, p-isopropylphenol, p-nonylphenol, 2,3-dimethylphenol, 2,4-dimethylphenol, 2,5-dimethylphenol, 2,6-dimethylphenol, 3,4-dimethylphenol, 3,5-dimethylphenol, o-ethylphenol, m-ethylphenol, p-ethylphenol, 2,3,4-trimethylphenol, 2,3,5-trimethylphenol, 3,4,5-trimethylphenol and mixtures thereof.

The aldehydes in the instant disclosure can be represented by the formula:

in which $R_a$ and $R_c$ are the same or different, when one of $R_a$ and $R_c$ is hydrogen, the other can be selected from hydrogen and substituted or unsubstituted C1-C12 alkyl, C6-C18 aryl, C2-C12 alkenyl, C3-C12 cycloalkyl, and C6-C16 aralkyl; when $R_a$ and $R_c$ are not hydrogen, one of $R_a$ and $R_c$ is selected from aldehyde-substituted C1-C12 alkyl, aldehyde-substituted C6-C18 aryl, aldehyde-substituted C2-C12 alkenyl, aldehyde-substituted C3-C12 cycloalkyl, and aldehyde-substituted C6-C16 aralkyl, and the other one can be selected from substituted or unsubstituted C1-C12 alkyl, C6-C18 aryl, C2-C12 alkenyl, C3-C12 cycloalkyl, and C6-C16 aralkyl; and $R_b$ is direct bond or conjugated linking group, such as vinylene groups and unsaturated C6-C18 aryl groups. Preferably, $R_b$ is selected from direct bond, methylidene, and ethylidene. Useful aldehydes include, for example, glyoxal, fumaraldehyde, hexa-2,4-dienedial, octa-2,4,6-trienedial, phenylglyoxal, terephthalaldehyde, phthalaldehyde, isophthalaldehyde, naphthalene dicarbaldehyde and mixtures thereof.

Polyphenolic condensation products (mixture) are synthesized from a condensation reaction, where an aldehyde is cationized by acid catalysts, and then the phenolic compounds attack the cationized positions of aldehyde via phenols' ortho or para position, one by one. Thus, the aldehyde may directly connect to one or more phenolic compound(s). Epoxidized products made from the polyphenolic condensation products are named as multi-functional epoxy resins (MFE, mixture), which is synthesized from polyphenolic condensates and epichlorohydrin (ECH) under a basic condition.

In one embodiment, the phenolic compound is phenol and aldehyde is glyoxal (GXA) and the reaction of the polyphenolic condensation products and epoxidized products thereof is shown by the following reaction path:

One of polyphenolic condensation products with all positions of a glyoxal connected is named as tetraphenol ethane (TPE), which is synthesized from glyoxal and phenol in an acid condition. Tetraphenol ethane epoxy resin (TNE) is made from TPE by following a general epoxidization reaction with epichlorohydrin (ECH) under a basic condition (e.g. NaOH). The maximum UV absorption wavelength of TPE is less than about 300 nm. Originally, TPE and/or TNE were not designed for purposes of UV blocking (340-370 nm). TPE and/or TNE provide a high crosslink density resulting in a high Tg of their molding or coating products, which is good for thermal properties. TPE and/or TNE have a relatively rigid structure that has a contribution to a high fluorescence emission which makes them good for fluorescence-based AOI systems in the PCB process. However, TPE or THE does not have high contribution from tetraphenol-structure molecules for UV absorption (340-370 nm), which is achieved by virtue of the other condensation products.

PNX for high UV absorption (340-370 nm) and related low in color are typically formed from at least one glyoxal and two to three phenols. In the foregoing reaction path, Compound A can react with a phenol under an acid condition and become Compound D. Compound D forms Compound E though an acid-catalyzed dehydration reaction. Compound E becomes Compound F via a Keto-Enol tautomerism. Compound G can be formed from an acid-catalyzed dehydration reaction of Compound E or Compound F. These PNX present in FIG. 4A in a GPC Mw range from about 270 to about 425, and have contributions to UV absorption in FIG. 4B at a detection wavelength of 365 nm.

Compound H can be formed from Compound B, Compound C, Compound E, or Compound G via an acid-catalyzed phenol formaldehyde condensation or an acid-catalyzed dehydration reaction. Other PNX formed from at least one glyoxal and three phenols, for example, are Compound I to Compound M. These PNX present in FIG. 4A in a GPC Mw range from about 425 to about 630, and have higher contributions to UV absorption in FIG. 4B at a detection wavelength of 365 nm.

For other types of phenolic compound and other types of aldehyde, their possible structures, which contribute to UV-absorbance (340-370 nm), of polyphenolic condensates and epoxidized products made from the forgoing condensates with their GPC Mw ranges are shown in the following table:

| | |
|---|---|
| GPC Mw Range | Min: 1.3 × [1 × (Molecular weight of aldehydes) + 2 × (Molecular weight of phenolic compounds) − 2 × (Molecular weight of water)]<br>Max: 1.5 × [3 × (Molecular weight of aldehydes) + 3 × (Molecular weight of phenolic compounds) − 2 × (Molecular weight of water)] |
| Multi-functional epoxy resin (MFE) | |
| GPC Mw Range | Min: 1.3 × [1 × (Molecular weight of aldehydes) + 2 × (Molecular weight of phenolic compounds) − 2 × (Molecular weight of water)]<br>Max: 1.5 × [3 × (Molecular weight of aldehydes) + 3 × (Molecular weight of phenolic compounds) − 2 × (Molecular weight of water) + 168] | in which $R_d$ and $R_e$ are the same or different, and can be selected from methylidene, ethylidene, substituted or unsubstituted C1-C6 alkyl, substituted or unsubstituted C1-C6 alkenyl and alkynyl; and $R_f$ can be selected from ethylidene, substituted or unsubstituted C1-C6 alkyl and C1-C6 alkenyl group; and $R_{g1}$, $R_{g2}$ and $R_{g3}$ are the same or different and can be selected from hydrogen and 2-ethyloxirane; the number "168" in the formulation of GPC Mw Range of MFE represents the sum of molecular weight while three epoxy groups (–C3H5O) replace three hydrogen atoms of phenolic compounds.

The present applicant has adopted a multi-catalyst method that can directly control the amount (GPC Area %) of the target molecules. The acid catalysts used in the embodiments include p-Toluenesulfonic acid, oxalic acid, hydrochloric acid, sulfuric acid, phosphoric acid, trichloroacetic acid, acid-functional cationic exchange catalyst, acetic acid, citric acid, glycolic acid, lactic acid, malonic acid, succinic acid, maleic acid, salicylic acid, fumaric acid and their mixtures. The preferred acid catalysts include p-Toluenesulfonic acid and oxalic acid. In one embodiment, the aldehyde is glyoxal and the phenolic compound is phenol for synthesizing polyphenolic condensation products. As shown in the drawing FIGS. 3A and 3B, when polyphenolic condensation products have a property of Gardner index is not more than 13, their properties of UV absorbance (at 350 nm or at 365 nm) have positive relationship with the GPC integrated area of Mw=274 to Mw=630 at a detection wavelength of 254 nm. In some embodiments, the Gardener index of polyphenolic condensate is less than 13, the UV absorbance at 365 nm is at least 0.320 with the Mw range takes about 35% to about 50% of GPC integrated area of Mw=274 to 630 at a detection wavelength of 254 nm, and/or the UV absorbance at 350 nm is at least 0.550 with the same Mw range % of GPC integrated area of Mw=274 to 630 at a detection wavelength of 254 nm.

Figure 4A:
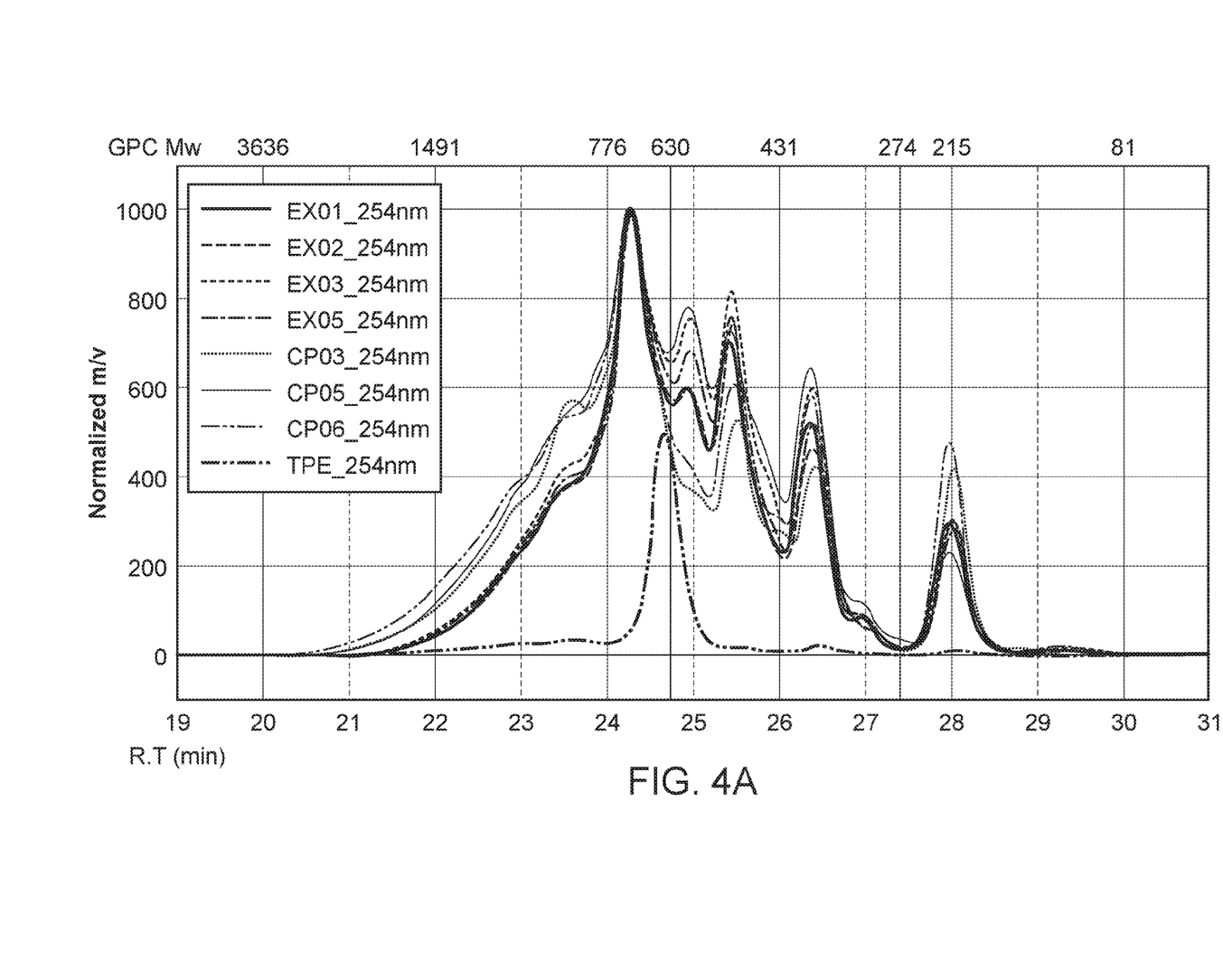
FIG. 4A is a normalized GPC graphical representation of Examples 1, 2, 3 and 5 versus Comparison Examples 3, 5 and 6 at a detection wavelength of 254 nm.
Figure 4B:
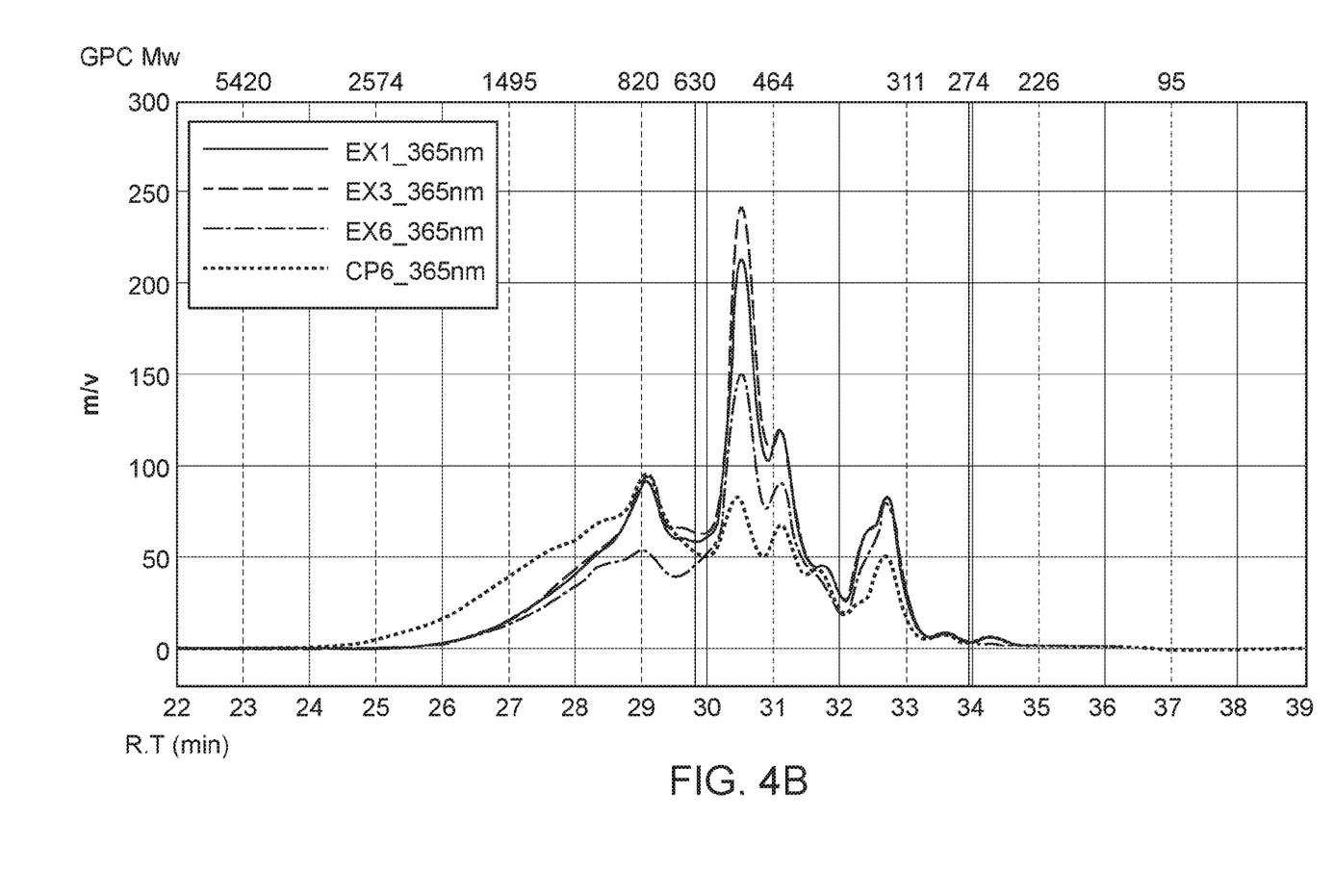
FIG. 4B is a GPC graphical representation of Examples 1, 3 and 6 versus Comparison Example 6 at a detection wavelength of 365 nm.

As shown in the GPC drawing FIGS. 4A and 4B, (FIG. 4A detection wavelength is 254 nm, while FIG. 4B detection wavelength is 365 nm) Example 1, 2, 3 and 5 (EX1, EX2, EX3 and EX5, respectively) as compared to the Comparison Examples (CP3, CP5 and CP6) of commercially available products have higher integrated-area ratio of the overall GPC area in the range of Mw 274 to Mw 630, where some molecules contribute to UV absorbance at 365 nm more than others. A commercially available pure TPE (tetraphenol ethane, from Sigma-Aldrich) is shown in FIG. 4A for reference. It is preferred that the weight average molecular weight (Mw) of polyphenolic condensates larger than 900 is limited to not more than 20% of overall GPC integrated area at a detection wavelength of 254 nm. It is also preferred that the condensation product has an UV absorbance of at least 0.320 at 365 nm and/or at least 0.550 at 350 nm. In some cases, the Gardner Index is about 11, 12, -to about 13, and the powder CIE L*a*b* color space L* value is typically in the range of about 60 to about 75, the L* value may also be in the range of about 65 to about 70; or from about 60, 61, 62, 63, 64, 65, 66, 67, 68, 69, 70, 71, 72, 73, 74 to about 75. The a* value is typically in the range of about 2 to 10, the a* value may also be in the range of about 4 to 8; or from about 2, 3, 4, 5, 6, 7, 8, 9 to about 10. The and b* value is typically in the range of about 20 to 35, the b* value may also be in the range of about 25 to about 30; or from about 25, 26, 27, 28, 29, 30, 31, 32, 33, 34 to about 35.

Figure 4C:
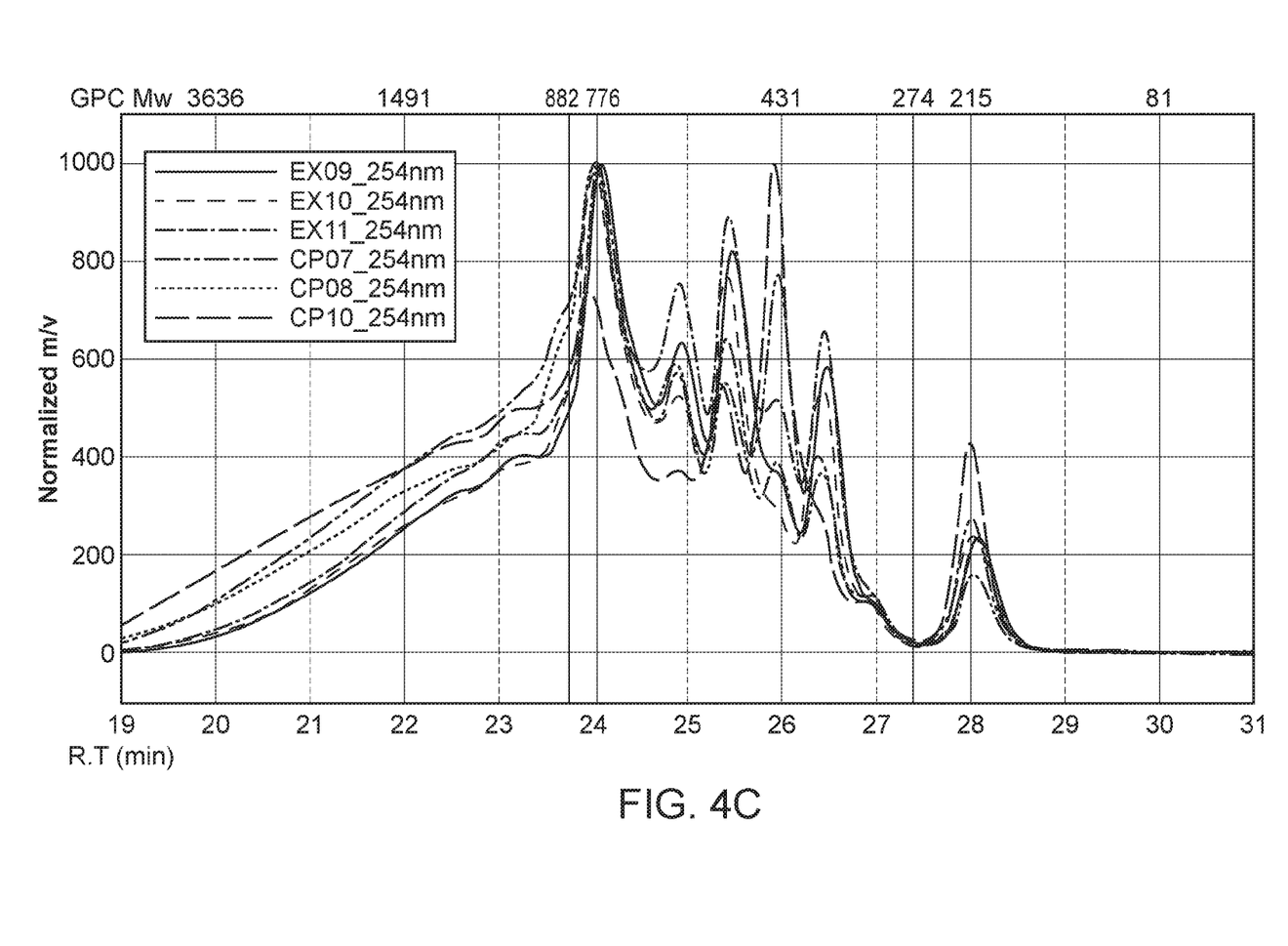
FIG. 4C is a normalized GPC graphical representation of Examples 9, 10 and 11 versus Comparison Example 7, 8 and 10 at a detection wavelength of 254 nm.

As shown in the GPC drawing FIG. 4C, multi-functional epoxy resins (MFE), made from the forgoing condensates, Example 9, 10 and 11 (EX9, EX10 and EX11, respectively) as compared to the Comparison Examples (CP7, CP8 and CP10) of commercially available products also have higher integrated-area ratio of the overall GPC area in the range of Mw 274 to Mw 882, where some molecules contribute to UV absorbance more than others. It is also preferred that the epoxidized product has an UV absorbance of at least 0.240 at 365 nm and/or at least 0.430 at 350 nm. In some cases, the Gardner Index is about 12, 13, 14 to about 15 and the powder CIE L*a*b* color space of the powder L* value is about 72, 73, 74, 75, 76 to about 77, a* value is about 5, 6, 7, 8 to about 9 and b* value is about 36, 37, 38 to about 39.

A comparison between the embodiments herein and those of a commercially available product (Hexion SD-357B) are demonstrated below, where A/P means the mole ratio of aldehyde (glyoxal) to phenolic compound (phenol). Regarding the process, Hexion claims a A/P of 0.15-0.22, while the present embodiments are in the range 0.12-0.17, although it is to be understood that the minimum or maximum endpoints may be modified by the term about, and further that the minimum and maximum endpoints may be found among the following values: 0.1235, 0.125, 0.1275, 0.13, 0.135, 0.1375, 0.140, 0.1435, 0.145, 0.1475, 0.150, 0.1535, 0.155, 0.1575, 0.160, 0.1635, 0.165 and 0.1675; preferably 0.135. The present process embodiments utilize multi catalysts, while the comparative process of Hexion (gleaned from U.S. Pat. Nos. 6,001,950; 6,201,094; 6,239,248; 6,140,421; 6,379,800; 6,316,583; 6,232,399; the disclosures of all of which are herein incorporated by reference) utilize only one catalyst. Hexion selects a catalyst from OXA (Oxalic acid) or TCA (Trichloroacetic acid) or TFA (Trifluoroacetic acid).

In the aspect of product properties, the embodiments described herein maintain or improves, the good properties of UV and Gardner Index (G). Additionally, the embodiments of polyphenolic condensates described herein takes more GPC integrated area ratio of Mw range within the expression, 1.3×[1×(Molecular weight of aldehydes)+2×(Molecular weight of phenolic compounds)−2×(Molecular weight of water)] to 1.5×[3×(Molecular weight of aldehydes)+3×(Molecular weight of phenolic compounds)−2×(Molecular weight of water)], than the commercial product. Furthermore, the embodiments of multi-functional epoxy resins (MFE) made from the forgoing condensates described herein takes more GPC integrated area ratio of Mw range within the expression: 1.3×[1×(Molecular weight of aldehydes)+2×(Molecular weight of phenolic compounds)−2×(Molecular weight of water)] to 1.5×[3×(Molecular weight of aldehydes)+3×(Molecular weight of phenolic compounds)−2×(Molecular weight of water)+168], than the commercial product. The Mw/Mn ratio of the products of the embodiments is smaller than the commercial products' Mw/Mn ratio. Mw/Mn means Polydispersity index. The more the Mw/Mn of PNX is, the more insoluble emulsion side products are found during the epoxidation process.

EXAMPLES

The following Examples (EX) of various embodiments and Comparative Examples (CP) are provided.

Example 1 (EX1)

Synthesis of Polyphenolic Condensates with Multi Catalysts

There was added 1885 g of phenol (20.05 moles), 392 g of 40 wt % glyoxal in water (2.70 moles), and 1.7 g of p-Toluenesulfonic acid monohydrate as a catalyst (0.009 moles, 1.08% based on glyoxal) in a 3 L-glass flask fitted with a condenser, a feeding pipe, and a mechanical stirrer. The mole ratio of glyoxal to phenol was 0.135. The temperature of the mixture was permitted to reflux (102-104° C.) and it was maintained for 8 hours. Then the mixture was cooled to below 100° C., followed by a neutralization of the catalyst with 85 g of 2 wt % sodium carbonate solution. To the reaction was added 5 g of oxalic acid dihydrate (0.04 moles) and heated to 140° C. for an atmospheric distillation. After 2 hours, unreacted phenol was removed under vacuum at about 160° C. for an hour and 170° C. for half an hour. 100 g of water vapor was inputted for stream stripping in a time period of about an hour. This was followed by full vacuum at about 170° C. for half an hour to obtain the product. The CIE L*a*b* color space of the product powder L* value is 71.90, a* value is 2.27 and b* value is 25.05. Other properties of the polyphenolic condensates are given in the Tables that follow.

Example 2 (EX2)

Synthesis of Polyphenolic Condensates with Multi Catalysts

The polyphenolic condensates were prepared in the same procedure as that of Example 1, except that: p-Toluenesulfonic acid monohydrate was 1.51 g (0.008 moles, 0.96% based on glyoxal); 2 wt % sodium carbonate solution was 70 g; and oxalic acid dihydrate was 2.5 g (0.02 moles).

Example 3 (EX3)

Synthesis of Polyphenolic Condensates with Multi Catalysts

The polyphenolic condensates were prepared in the same procedure as that of Example 1, except that: p-Toluenesulfonic acid monohydrate was 0.85 g (0.004 moles, 0.54% based on glyoxal); 2 wt % sodium carbonate solution was 40 g; and oxalic acid dihydrate was 5 g (0.04 moles). The CIE L*a*b* color space of the product powder L* value is 67.26, a* value is 4.50 and b* value is 25.67.

Example 4 (EX4)

Synthesis of Polyphenolic Condensates with Multi Catalysts

The polyphenolic condensates were prepared in the same procedure as that of Example 1, except that: p-Toluenesulfonic acid monohydrate was 2.9 g (0.015 moles, 1.85% based on glyoxal); 2 wt % sodium carbonate solution was 135 g; and oxalic acid dihydrate was 5 g.

Example 5 (EX5)

Synthesis of Polyphenolic Condensates with Multi Catalysts

The polyphenolic condensates were prepared in the same procedure as that of Example 1, except that: p-Toluenesulfonic acid monohydrate was 1.2 g (0.006 moles, 0.77% based on glyoxal); 2 wt % sodium carbonate solution was 60 g; and oxalic acid dihydrate was 10 g.

Example 6 (EX6)

Synthesis of Polyphenolic Condensates with Multi Catalysts

There was added 1880 g of phenol (20.0 moles), 440 g of 40 wt % glyoxal in water (3.03 moles), and 30 g of oxalic acid dihydrate as a catalyst (0.7% based on glyoxal) in a 3 L-glass flask fitted with a condenser, a feeding pipe, and a mechanical stirrer. The mole ratio of glyoxal to phenol was 0.152. The temperature of the mixture was permitted to reflux (102-104° C.) and it was remained for 4 hours. Then the mixture was cooled to below 100° C. To the reaction was added 2.3 g of p-Toluenesulfonic acid monohydrate (0.012 moles, 1.31% based on glyoxal), heated to 10° C. and it was maintained for 4 hours. Then the mixture was cooled to below 100° C. To the mixture was added 110 g of 2 wt % sodium carbonate solution for neutralization. The reaction was heated to 140° C. for an atmospheric distillation. After 2 hours, unreacted phenol was removed under vacuum at about 160° C. for an hour and 170° C. for half an hour. 100 g of water vapor was inputted for stream stripping in a time period of about an hour. This was followed by full vacuum at about 170° C. for half an hour to obtain the product. The CIE L*a*b* color space of the product powder L* value is 70.48, a* value is 2.28 and b* value is 25.10. Other properties of the polyphenolic condensates are given in the Tables that follow.

Example 7 (EX7)

Synthesis of Polyphenolic Condensates with Multi Catalysts

The polyphenolic condensates were prepared in the same procedure as that of Example 6, except that: oxalic acid dihydrate was 50 g; p-Toluenesulfonic acid monohydrate was 1.4 g; and 2 wt % sodium carbonate solution was 60 g.

Example 2 (EX8)

Synthesis of Polyphenolic Condensates with Multi Catalysts

The polyphenolic condensates were prepared in the same procedure as that of Example 1, except that: p-Toluenesulfonic acid monohydrate was 1.0 g (0.005 moles, 0.64% based on glyoxal); 2 wt % sodium carbonate solution was 50 g; and oxalic acid dihydrate was 15 g (0.12 moles). The CIE L*a*b* color space of the product powder L* value is 71.68, a* value is 2.30 and b* value is 25.02.

Comparison Example 1 (CP1)

Synthesis of Polyphenolic Condensates with Oxalic Acid

There was added 1885 g of phenol (20.05 moles), 392 g of 40 wt % glyoxal in water (2.70 moles), and 6.5 g of oxalic acid dihydrate as a catalyst (4.15% based on glyoxal) in a 3 L-glass flask fitted with a condenser, a feeding pipe, and a mechanical stirrer. The mole ratio of glyoxal to phenol is 0.135. The temperature of the mixture is permitted to reflux (102-104° C.) and it was maintained for 8 hours. Then it was heated to 140° C. for atmospheric distillation. After 2 hours, unreacted phenol was removed under vacuum at about 160° C. for an hour and 170° C. for half an hour. 100 g of water vapor was inputted for stream stripping in an hour. This was followed by full vacuum at about 170° C. for half an hour to obtain the product. The CIE L*a*b* color space of the product powder L* value is 62.43, a* value is 6.80 and b* value is 25.85. Other properties of the polyphenolic condensates are given in the Tables that follow.

Comparison Example 2 (CP2)

Synthesis of Polyphenolic Condensates with Oxalic Acid

The polyphenolic condensates were prepared in the same procedure as that of Comparison Example 1, except that: oxalic acid dihydrate was 50 g (31.9% based on glyoxal).

Comparison Example 3 (CP3)

Synthesis of Polyphenolic Condensates with p-Toluenesulfonic Acid

The polyphenolic condensates was prepared in the same procedure as that of Comparison Example 1, except that: the oxalic acid was replaced with 0.85 g of p-Toluenesulfonic acid monohydrate; After 8 hours reflux, the reaction was cooled to below 100° C. and then it was added 40 g of 2 wt % sodium carbonate solutions for neutralization. The reaction was heated to 140° C. and followed the remaining process of Comparison Example 1. The CIE L*a*b* color space of the product powder L* value is 74.32, a* value is 3.10 and b* value is 26.85.

Comparison Example 4 (CP4)

Synthesis of Polyphenolic Condensates with p-Toluenesulfonic Acid

The polyphenolic condensates were prepared in the same procedure as that of Comparison Example 3, except that: p-Toluenesulfonic acid monohydrate was 0.5 g.

Comparison Example 5 (CP5)

Synthesis of Polyphenolic Condensates with Two Additions of Glyoxal (Following the Example 1 of U.S. Pat. No. 6,001,950)

There was added 1728 g of phenol (18.36 moles) and 69.1 g of oxalic acid dihydrate as a catalyst (38.05% based on overall glyoxal) at 90° C. in a 3 L-glass flask fitted with a condenser, a feeding pipe, and a mechanical stirrer. 227 g of 40 wt % glyoxal in water (1.57 moles) was added over 30 minutes and maintained the temperature at 90° C. for 1.5 hours. Then there was vacuum distilled about 180 g of distillate over 40 minutes at 90° C. Another 227 g of 40 wt % glyoxal in water (1.57 moles) was added over 25 minutes at 90° C. and the temperature was held for another 1.5 hours. The mole ratio of overall glyoxal to phenol was 0.17. It was followed by a vacuum distillation to remove about 190 g of distillate. The reaction was distilled at atmospheric pressure to 160° C. for 1 hour, and then it was vacuum distilled to remove phenol at 160° C. It was heated to 190° C. and held for 1 hour. Finally, 100 g of water vapor was inputted for stream stripping in an hour. Properties of the polyphenolic condensates are given in the Tables that follow.

Comparison Example 6 (CP6)

Commercial Product

Comparison Example 6 is Durite® SD-357B, a commercial polyphenolic condensate from Hexion (Borden Chemical). The CIE L*a*b* color space of the product powder L* value is 73.26, a* value is 4.09 and b* value is 32.28.

TABLE 1

Polyphenolic condensates

| | GPC | | | | HPLC | UV | | Color Gardner Index (G) |
|---|---|---|---|---|---|---|---|---|
| | Mw | Mw/Mn | Mw = 274-630% | Mw >900% | TPE wt % | UV 365 | UV 350 | 5% in methanol |
| EX1 | 646 | 1.207 | 43.9 | 14.1 | 11.8 | 0.340 | 0.616 | 11.6 |
| EX2 | 644 | 1.215 | 43.6 | 14.1 | 11.3 | 0.341 | 0.614 | 11.8 |
| EX3 | 638 | 1.199 | 47.7 | 13.7 | 9.7 | 0.399 | 0.710 | 12.2 |
| EX4 | 655 | 1.208 | 42.5 | 15.2 | 14.6 | 0.345 | 0.625 | 11.4 |
| EX5 | 645 | 1.203 | 45.7 | 14.3 | 10.5 | 0.371 | 0.662 | 12.2 |
| EX6 | 663 | 1.219 | 41.0 | 16.2 | 13.4 | 0.337 | 0.610 | 12.0 |
| EX7 | 665 | 1.238 | 38.4 | 16.9 | 12.5 | 0.321 | 0.583 | 12.0 |
| EX8 | 640 | 1.205 | 46.9 | 13.7 | 9.9 | 0.396 | 0.705 | 12.1 |
| CP1 | 681 | 1.225 | 37.3 | 17.2 | 9.5 | 0.344 | 0.559 | 13.2 |
| CP2 | 698 | 1.201 | 37.7 | 18.5 | 10.2 | 0.385 | 0.569 | 13.8 |
| CP3 | 700 | 1.292 | 33.6 | 21.5 | 8.1 | 0.262 | 0.444 | 11.3 |
| CP4 | 704 | 1.326 | 34.6 | 23.2 | 6.4 | 0.261 | 0.491 | 11.7 |
| CP5 | 688 | 1.218 | 43.9 | 19.5 | 6.2 | 0.457 | 0.703 | 13.4 |
| CP6 | 725 | 1.318 | 34.8 | 23.6 | 7.8 | 0.334 | 0.519 | 12.2 |

Figure 3A:
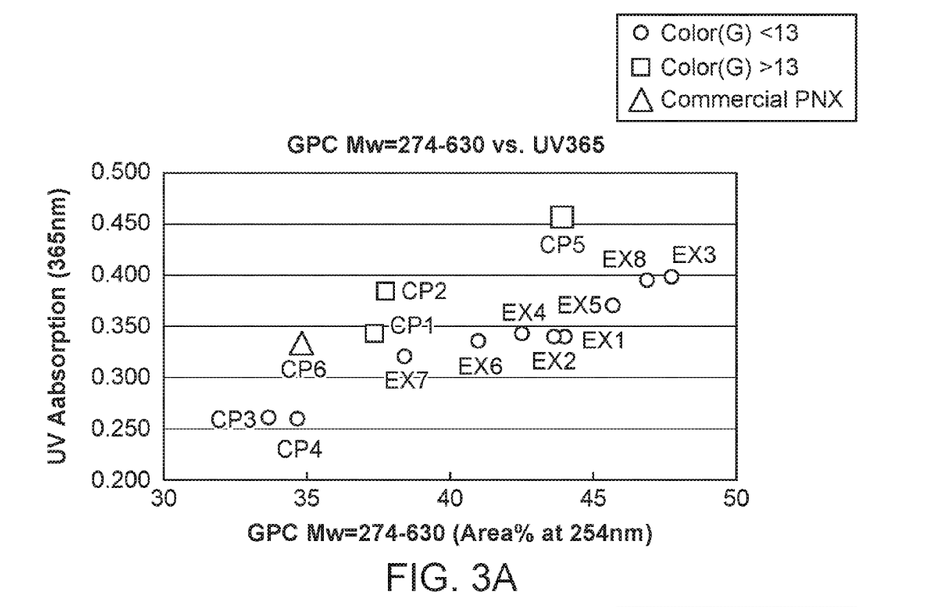
FIG. 3A is a relationship between the PNX GPC integrated area of Mw=274-630 with UV absorbance at a detection wavelength of 365 nm.
Figure 3B:
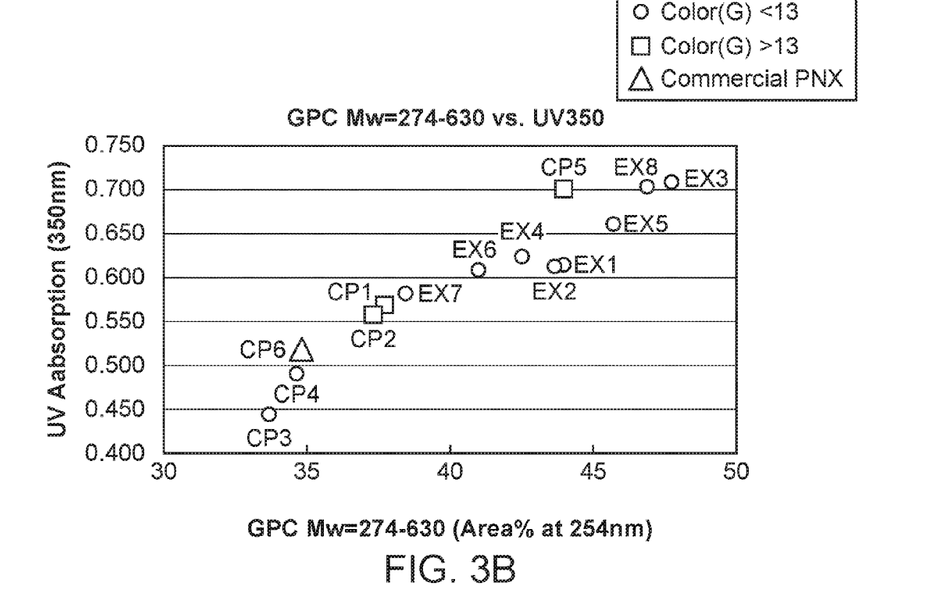
FIG. 3B is a relationship between the PNX GPC integrated area of Mw=274-630 with UV absorbance at a detection wavelength of 350 nm.

In Table 1, EX1 to EX8 have lower Mw/Mn, which means the molecular weight distribution is narrow. Furthermore, EX1 to EX8 have lower content of GPC Mw>900. These two properties may reduce the emulsion side-products during the epoxidation as shown in Table 2. As shown in the diagrams of FIGS. 3A and 3B, it is more clear that UV absorbance of EX1 to EX8 have positive relationship with their GPC integrated area of Mw=274 to Mw=630 at a detection wavelength of 254 nm. With low Gardner Index (G), products of EX1 to EX8 still have relatively higher UV absorbance at 365 nm or 350 nm. CP1, CP2 and CP5 have an acceptable property of UV absorbance but its Gardner Index (G) is too high, while CP3 and CP4 have low Gardner Index (G) but very low UV absorption. The products of EX1 to EX8 have a CIE L* a* b* color space wherein L* is about 67 to about 72, a* is about 2 to about 5, and b* is about 25 to about 26. The amount of tetraphenol ethane in the products of EX1 to EX8 is about 9 wt % to 15 wt %, while it in most of Comparison Examples is about less than 10 wt %. The higher amount of tetraphenol ethane may have positive contributions to thermal and fluorescence properties of furthering applications.

Example 9 (EX9)

Synthesis of Multi-Functional Epoxy Resin from EX1

The procedure of preparing an epoxy resin of polyphenolic condensates can be found in U.S. Pat. No. 6,001,873. To an 1L-4-neck reactor equipped with a device for controlling and showing the temperature and pressure and a device for condensing co-distillation mixture of water, epihalohydrin and the solvents and separating them into an organic phase and an aqueous phase, were added 970 g of the product of Example 1, 715 g of epihalohydrin (7.73 moles), 4.5 g of benzyltriethylammonium chloride as a catalyst (0.02 moles), and 300 g of isopropyl acetate. The mixture was stirred to form a homogeneous solution under atmospheric pressure and then heated to 70° C. under absolute pressure of 190 mm Hg. After reaching equilibrium of the pressure and the temperature, to the mixture was added 650 g of 49.5% aqueous sodium hydroxide solution at a constant rate over 7 hours while water contained in the reaction system was azeotropically distilled and condensed. The condensed azeotrope was separated into an organic phase and an aqueous phase, the organic phase was sequentially recycled into the reaction system and the aqueous phase was discarded. After the reaction had completed, unreacted epichlorohydrin and the solvent were distilled off under reduced pressure. Sodium chloride contained in the resulting crude epoxy resin was dissolved in toluene and deionized water and washed off with water. The emulsion side-products were located between the layers of organic solvent and water. The emulsion layer were collected for measuring volume, while the organic solvent was distilled from the resulting mixture under reduced pressure to obtain the epoxy resin. Properties of the multi-functional epoxy resin are given in the Tables that follow.

Example 10 to Example 12

The epoxy resin product of Example 10 to Example 12 were synthesized in the same procedure as that in the Example 9, but the polyphenolic condensates were replaced with the products of EX2, EX3 and EX4 for Example 10, Example 11 and Example 12, respectively. All properties of multi-functional epoxy resin are given in the Tables that follow.

Comparison Example 7 to Comparison 8

The epoxy resin product of Comparison Example 7 to Comparison Example 9 were synthesized in the same procedure as that in the Example 9, but the polyphenolic condensates were replaced with the products of CP1, CP2 and CP6 for Comparison Example 7, Comparison Example 8 and Comparison Example 9, respectively. All properties of the multi-functional epoxy resin are given in the Tables that follow.

TABLE 2

Multi-functional epoxy resins

| | | GPC | | | Reaction/Product | | | UV | | Gardner Index (G) | Color | | |
|---|---|---|---|---|---|---|---|---|---|---|---|---|---|
| MFE | PNX | Mw | Mw/Mn | Mw = 274-882 | Emulsion (mL) | EEW | HyCl | UV 365 | UV 350 | 17.5% in methanol | CIE $L^*$ | CIE $a^*$ | CIE $b^*$ |
| EX9 | EX1 | 851 | 1.393 | 65.7 | 7.9 | 199.3 | 245 | 0.242 | 0.430 | 13.1 | 76.96 | 5.37 | 38.39 |
| EX10 | EX2 | 820 | 1.392 | 66.9 | 7.8 | 198.6 | 566 | 0.253 | 0.442 | 13.3 | — | — | — |
| EX11 | EX3 | 861 | 1.398 | 64.9 | 7.7 | 199.9 | 112 | 0.286 | 0.491 | 13.8 | 75.55 | 5.93 | 36.70 |
| EX12 | EX4 | 905 | 1.394 | 63.3 | 8.9 | 196.2 | 378 | 0.252 | 0.450 | 12.9 | 77.11 | 5.41 | 37.89 |
| CP7 | CP1 | 1005 | 1.530 | 58.1 | 10.4 | 208.7 | 783 | 0.266 | 0.448 | 14.2 | 73.11 | 8.15 | 38.08 |
| CP8 | CP2 | 1113 | 1.579 | 56.7 | 11.7 | 209.7 | 298 | 0.283 | 0.446 | 15.0 | 72.19 | 8.66 | 38.18 |
| CP9 | CP6 | 1265 | 1.911 | 50.7 | 14.2 | 210.6 | 552 | 0.251 | 0.375 | 13.3 | 74.91 | 7.93 | 42.18 |

As shown in the Table 2, the multi-functional epoxy resins of EX9 to EX12 have low Gardner Indexes resulting from the low Gardner Indexes of polyphenolic condensates. Moreover, EX9 to EX12 have better UV absorbance at 365 nm and/or 350 nm with the similar or lower color index to the commercial one, CP9. Given a lower Mw/Mn of polyphenolic condensates, emulsion side-products of epoxidation reactions in EX9 to EX12 are less than other processes. The products of EX9 to EX12 have a CIE $L^*$ $a^*$ $b^*$ color space wherein $L^*$ is about 75 to about 77, $a^*$ is about 5 to about 7, and $b^*$ is about 36 to about 39.

Example 13 to Example 14

Examples of flame-retarding compositions, according to Taiwan Patent Nos. I307350, I324168, and U.S. Patent Publication No. 2008/0064792, (now U.S. Pat. No. 7,662,902), are demonstrated below. (These patents and publication are herein incorporated by reference in their entireties). Replacing TNE190A70 (manufactured by Chang-Chun Plastic Co., Ltd., Taiwan) with multi-functional epoxy resin EX9, all the thermal properties were almost identical to the original.

TABLE 3

| | EX13 | TWI307350 | EX 14 | TWI324168 (US20080064792) (U.S. Pat. No. 7,662,902) |
|---|---|---|---|---|
| Composition | | | | |
| TNE190A70 | — | 15.8 | — | 9.5 |
| EX9 70% in | 15.8 | — | 9.5 | — |

TABLE 3-continued

| | EX13 | TWI307350 | EX 14 | TWI324168 (US20080064792) (U.S. Pat. No. 7,662,902) |
|---|---|---|---|---|
| acetone | | | | |
| Curing Agent | 7.8 | 7.8 | 7.8 | 7.8 |
| Ti—N Copolymerized Composite | 5 | 5 | — | — |
| Silicate-Copolymerized Composite | — | — | 5 | 5 |
| Silicon Dioxide | 70 | 70 | 78 | 78 |
| Trimethoxysilane | 0.5 | 0.5 | — | — |
| Triphenyl-phosphine | — | — | 0.3 | 0.3 |
| Carnauba Wax | 0.6 | 0.6 | 0.6 | 0.58 |
| Carbon Black | — | — | 0.3 | 0.3 |
| Properties | | | | |
| Td (° C.) | 420 | 418 | 418 | 416 |
| Flammability (UL-94) | V-0 | V-0 | V-0 | V-0 |
| Water Abs. (%) | 0.22 | 0.23 | 0.22 | 0.24 |

Example 15 to Example 18

Examples of bromine-containing and halogen-free epoxy resins, according to Taiwan Patent No. I324164, and U.S. Pat. No. 7,662,902, are illustrated in the following. Replacing TNE190A70 (manufactured by Chang-Chun Plastic Co., Ltd., Taiwan) with multi-functional epoxy resins EX9, all the thermal properties were almost identical to the original.

Columns for 254 nm: TSKgel G3000HXL, G2000HXL, G1000HXL
Columns for 365 nm: TSKgel G3000HXL, G2000HXL, G2000HXL, G1000HXL
Column Temperature: 40° C.
Mobile Phase: Tetrahydrofuran (THF) 1.0 mL/min
Sample concentration: 5 mg in 3 ml THF
Injection volume: 60 μL
Integration region: 16-32 min (254 nm); 19-40 min (365 nm)
Standards: as shown in the following table, polystyrene standards are commercial available from Alfa Aesar, Waters and Shodex STANDARD. Phenol is available from Sigma-Aldrich.

| Type | Mp (Mw) | Brand |
|---|---|---|
| Polystyrene | 123,000 | Alfa Aesar |
| Polystyrene | 25,547 | Alfa Aesar |
| Polystyrene | 15,700 | Waters |
| Polystyrene | 13,648 | Alfa Aesar |
| Polystyrene | 9,130 | Waters |
| Polystyrene | 6,540 | Waters |
| Polystyrene | 4,920 | Waters |
| Polystyrene | 3,470 | Waters |
| Polystyrene | 2,780 | Shodex STANDARD |
| Polystyrene | 2,280 | Waters |
| Polystyrene | 1,250 | Waters |
| Polystyrene | 580 | Shodex STANDARD |
| Polystyrene | 474 | Waters |
| Polystyrene | 266 | Waters |
| Phenol | 94 | Sigma-Aldrich |

HPLC Analysis Conditions
Apparatus: Waters 600

TABLE 4

| | Bromine-Containing Epoxy Resin | | | | Halogen-Free Epoxy Resin | | | |
|---|---|---|---|---|---|---|---|---|
| | EX15 | U.S. Pat. No. 7,662,902 | EX16 | U.S. Pat. No. 7,662,902 | EX17 | U.S. Pat. No. 7,662,902 | EX18 | U.S. Pat. No. 7,662,902 |
| Composition | | | | | | | | |
| TNE190A70 | — | 110 | — | 120 | — | 50 | — | 50 |
| BNE200A70 | 1000 | 1000 | 1000 | 1000 | — | — | — | — |
| BB400T60 | 230 | 230 | 300 | 295 | — | — | — | — |
| BEP330A70 | — | — | — | — | 1000 | 1000 | 1000 | 1000 |
| EX9 70% in acetone | 110 | — | 120 | — | 50 | — | 50 | — |
| PF hardener resins in U.S. Pat. No. 7,662,902 | 1063 | 1062.9 | 1372 | 1372 | 372 | 372.1 | 455 | 454.7 |
| MIBK | 60 | 60 | 45 | 45 | 125 | 125 | 120 | 120 |
| Properties | | | | | | | | |
| Flammability (UL-94) | V0 | V0 | V0 | V0 | V0 | V0 | V0 | V0 |
| Tg (° C.) DSC | 180 | 180 | 182 | 182 | 150 | 150 | 152 | 152 |
| Td (° C.) TGA | 361 | 360 | 360 | 363 | 390 | 390 | 390 | 390 |
| Thermal Stress (288° C., 20 s) | Pass | Pass | Pass | Pass | Pass | Pass | Pass | Pass |
| Water Absorption (%) | 0.18 | 0.21 | 0.19 | 0.20 | 0.22 | 0.20 | 0.23 | 0.24 |
| Surface Resistivity | >1010 | >1010 | >1010 | >1010 | >1010 | >1010 | >1010 | >1010 |
| Volume Resistivity | >1012 | >1012 | >1012 | >1012 | >1012 | >1012 | >1012 | >1012 |
| Dk @ 1 MHz | 4.3 | 4.3 | 4.3 | 4.2 | 4.6 | 4.2 | 4.5 | 4.3 |
| Df @ 1 MHz | 0.021 | 0.021 | 0.020 | 0.022 | 0.020 | 0.021 | 0.018 | 0.022 |

The following Test methods were employed on the below condensates and epoxides.
Condensates and Epoxy Analytic Methods
Gel-Permeation Chromatography (GPC):
Apparatus: Waters 717 Autosampler, Waters 515 Pumps
Detector: Waters 2487 Dual λ. Absorbance Detector
Detect Wavelength: 254 nm, 365 nm
Detect Temperature: 25° C.

Detector: Waters 2487 Dual λ. Absorbance Detector
Detect Wavelength: 254 nm
Column: Waters XTerra RP18 4.6 mm×250 mm, 5 um
Column Temperature: 40° C.
Mobile Phase: Water: Acetonitrile=82:18 to 0:100 (v.v) over 80 mins
Flow Rate of Mobile Phase: 1.0 mL/min HPLC is for measuring TPE wt % in the polyphenolic condensates
Gardner Index:
Method: according to ASTM D6166
Concentration: Polyphenolic condensates 5 wt % in Methanol
Multi-functional epoxy resins 17.5 wt % in Methanol
CIE L*a*b* Color Space:
Apparatus: NIPPON DENSHOKU COH 300A
Sample: powder 10 g in a quartz cuvette (powder diameter≤100 μm)
Ultraviolet-Visible Spectrophotometry (UV-Vis):
Apparatus: PerkinElmer UV/Vis Spectrometer Lambda 25
Cuvette: 1 cm
Concentration: 10 mg Sample/100 mL THF
Detect Wavelength: 350 nm and 365 nm are referred to as UV350 and UV365, respectively.
Epoxy equivalent weight (EEW): follows the method of ASTM D1652.
CCL Analytic Methods
Dielectric Constant (Dk), Dissipation Factor (Df) are measured by IPC-TM-650-2.5.5.9
Glass Transition Temperature (Tg) are measured according to IPC-TM-650-2.4.25 by using Differential scanning calorimetry (DSC) (Scan Rate: 20° C./min).
Decomposition Temperature (Td, 5% Weight loss) is measured according to IPC-TM-650-2.3.40 by Thermogravimetric analyzer (TGA) (Scan Rate: 10° C./min).
Water Absorption (wt %): is the specimen placed in a 100° C. water and two hours later, the rate of increase in weight (wt %) measured
Thermal stress (S-288) is measured according to JIS-C-6481: Immerse the electrical laminate into a 288° C. solder furnace and measure the time when it delaminates.
Flammability is measured according to UL94

Applicant has found that the use of the multi catalyst system according to the present embodiments controls Mw/Mn ratio of polyphenolic condensates (PNX) resulting in:

Gardner Index is adjustable by using different amounts of catalysts

Reducing the amount of catalyst as utilized in previous process

Reducing Mw/Mn ratio resulting in lower emulsion side-products in epoxidization process Increasing UV 350 and UV 365 absorption Applicant has also discovered the correlation between UV 365 and/or UV 350 and Mw range such that Realizing target molecules for enhancing UV 365 and/or UV 350 absorption A Mw range within the expression, 1.3× [1×(Molecular weight of aldehydes)+2×(Molecular weight of phenolic compounds)−2×(Molecular weight of water)] to 1.5× [3×(Molecular weight of aldehydes)+3×(Molecular weight of phenolic compounds)−2×(Molecular weight of water)], results in 35-50% of the GPC total integrated area of PNX A Mw range within the expression, 1.3×[1×(Molecular weight of aldehydes)+2×(Molecular weight of phenolic compounds)−2×(Molecular weight of water)] to 1.5× [3×(Molecular weight of aldehydes)+3×(Molecular weight of phenolic compounds)−2×(Molecular weight of water)+168], results in 60-70% of the GPC total integrated area of MFE While we have described our embodiments for the understanding of those skilled in the art, it is to be expressly understood that the embodiments are exemplary only and do not measure the scope of protection as found in the appended claims.

The terms "comprising," "having," and "including" are used in their open, nonlimiting sense. The terms "a" and "the" are understood to encompass the plural as well as the singular. The expression "at least one" means one or more and thus includes 15 individual components as well as mixtures/combinations. The term "about" when referring to a value, is meant specifically that a measurement can be rounded to the value using a standard convention for rounding numbers. For example, "about 1.5" is 1.45 to 1.54. All valued set forth herein can be modified with the term "about" or recited without the term, regardless of whether the term "about" is specifically set forth (or is 20 absent) in conjunction with any particular value. All ranges and values disclosed herein are inclusive and combinable. For examples, any value or point described herein that falls within a range described herein can serve as a minimum or maximum value to derive a sub-range, etc.

The invention claimed is:

1. Polyphenolic condensates from aldehydes and phenolic compounds which comprise: an aldehyde-phenolic condensate having a range of weight average molecular weight (Mw), calculated as polystyrene and phenol, satisfying the expression, 1.3×[1×(Molecular weight of aldehydes)+2× (Molecular weight of phenolic compounds)−2×(Molecular weight of water)] to 1.5×[3×(Molecular weight of aldehydes)+3×(Molecular weight of phenolic compounds)−2× (Molecular weight of water)]; the Mw range takes about 35% to about 50% of overall Gel-Permeation Chromatography (GPC) integrated area at a detection wavelength of 254 nm; and a Gardner Index is not more than 13.

2. The condensates of claim 1, wherein the phenolic compound is selected from the group consisting of phenol, o-methylphenol, m-methylphenol, p-methylphenol, para-tert-butyl-phenol, p-octylphenol, p-phenylphenol, p-cumyl-phenol, p-isopropylphenol, p-nonylphenol, 2,3-dimethylphenol, 2,4-dimethylphenol, 2,5-dimethylphenol, 2,6-dimethylphenol, 3,4-dimethylphenol, 3,5-dimethylphenol, o-ethylphenol, m-ethylphenol, p-ethylphenol and mixtures thereof.

3. The condensates of claim 1, wherein the aldehyde is selected from the group consisting of glyoxal, fumaraldehyde, hexa-2, 4-dienedial, octa-2, 4, 6-trienedial, phenylglyoxal, terephthalaldehyde, phthalaldehyde, isophthaldehyde, napthalene dicarbaldehyde and mixtures thereof.

4. An epoxy compound which is epoxidized from the condensates of claim 1 and comprise:

having a range of weight average molecular weight (Mw), calculated as polystyrene and phenol, satisfying the expression, 1.3×[1×(Molecular weight of aldehydes)+ 2×(Molecular weight of phenolic compounds)−2×(Molecular weight of water)] to 1.5×[3×(Molecular weight of aldehydes)+3×(Molecular weight of phenolic compounds)−2×(Molecular weight of water)+168]; the Mw range takes about 60% to about 70% of overall Gel-Permeation Chromatography (GPC) integrated area at a detection wavelength of 254 nm; and a Gardner Index is not more than 13.

5. The epoxy compound of claim 4, wherein the epoxy compound has an ultraviolet (UV) absorbance of at least 0.240 at 365 nm or at least 0.430 at 350 nm.

6. A process of preparing polyphenolic condensates from aldehydes and phenolic compounds which comprise:

(a) condensing a mixture of condensates, from a molar ratio of aldehydes to phenolic compounds being about 0.11 to 0.17;

(b) adding at least one acid catalyst to the mixture in the presence of about 0.05% to 16% of aldehyde charged for condensation reactions;

(c) obtaining polyphenolic condensates having a range of weight average molecular weight (Mw), calculated as polystyrene and phenol, wherein the range satisfying the expression, $1.3 \times [1 \times$(Molecular weight of aldehydes)$+2 \times$(Molecular weight of phenolic compounds)$-2$(Molecular weight of water)] to $1.5 \times [3 \times$(Molecular weight of aldehydes)$+3 \times$(Molecular weight of phenolic compounds)$-2 \times$(Molecular weight of water)]; the Mw range takes about 35% to about 50% of overall Gel-Permeation Chromatography (GPC) integrated area at a detection wavelength of 254 nm; and a Gardner Index is not more than 13.

7. The process of claim 6, wherein the phenolic compound is selected from the group consisting of phenol, o-methylphenol, m-methylphenol, p-methylphenol, para-tert-butyl-phenol, p-octylphenol, p-phenylphenol, p-cumylphenol, p-isopropylphenol, p-nonylphenol, 2,3-dimethylphenol, 2,4-dimethylphenol, 2,5-dimethylphenol, 2,6-dimethylphenol, 3,4-dimethylphenol, 3,5-dimethylphenol, o-ethylphenol, m-ethylphenol, p-ethylphenol, 2,3,4-trimethylphenol, 2,3,5-trimethylphenol, 3,4,5-trimethylphenol and mixtures thereof.

8. The process of claim 6, wherein the aldehyde is selected from the group consisting of glyoxal, fumaraldehyde, hexa-2,4-dienedial, octa-2,4,6-trienedial, phenylglyoxal, terephthalaldehyde, phthalaldehyde, isophthalaldehyde, naphthalene dicarbaldehyde and mixtures thereof.

9. The process of claim 6, wherein the acid catalyst is selected from the group consisting of p-Toluenesulfonic acid, oxalic acid, hydrochloric acid, sulfuric acid, phosphoric acid, trichloroacetic acid, acid-functional cationic exchange catalyst and their mixtures.

10. An epoxy compound which is epoxidized from the polyphenolic condensates of claim 6.

11. A glyoxal-phenolic condensate from glyoxal and phenolic compounds which comprises:

an glyoxal-phenolic condensate having a range of weight average molecular weight (Mw), calculated as polystyrene and phenol, satisfies the expression, $1.3 \times [1 \times$(Molecular weight of aldehydes)$+2 \times$(Molecular weight of phenolic compounds)$-2 \times$(Molecular weight of water)] to $1.5 \times [3 \times$(Molecular weight of aldehydes)$+3 \times$(Molecular weight of phenolic compounds)$-2 \times$(Molecular weight of water)]; the Mw range takes about 35% to about 50% of overall Gel-Permeation Chromatography (GPC) integrated area at a detection wavelength of 254 nm; and a Gardner Index is not more than 13.

12. The condensates of claim 11, wherein the phenolic compound is selected from the group consisting of phenol, o-methylphenol, m-methylphenol, p-methylphenol, para-tert-butyl-phenol, p-octylphenol, p-phenylphenol, p-cumylphenol, p-isopropylphenol, p-nonylphenol, 2,3-dimethylphenol, 2,4-dimethylphenol, 2,5-dimethylphenol, 2,6-dimethylphenol, 3,4-dimethylphenol, 3,5-dimethylphenol, o-ethylphenol, m-ethylphenol, p-ethylphenol, 2,3,4-trimethylphenol, 2,3,5-trimethylphenol, 3,4,5-trimethylphenol and mixtures thereof.

13. An epoxy compound which is epoxidized from the glyoxal-phenolic condensates of claim 11 comprise:

a range of weight average molecular weight (Mw), calculated as polystyrene and phenol, satisfying the expression, $1.3 \times [1 \times$(Molecular weight of aldehydes)$+2 \times$(Molecular weight of phenolic compounds)$-2 \times$(Molecular weight of water)] to $1.5 \times [3 \times$(Molecular weight of aldehydes)$+3 \times$(Molecular weight of phenolic compounds)$-2 \times$(Molecular weight of water)$+168$]; the Mw range takes about 60% to about 70% of overall Gel-Permeation Chromatography (GPC) integrated area at a detection wavelength of 254 nm; an ultraviolet (UV) absorbance at least 0.240 at 365 nm or at least 0.430 at 350 nm; and a Gardner Index is not more than 13.

14. The epoxy compound of claim 13, wherein the phenolic compound is selected from the group consisting of phenol, o-methylphenol, m-methylphenol, p-methylphenol, para-tert-butyl-phenol, p-octylphenol, p-phenylphenol, p-cumylphenol, p-isopropylphenol, p-nonylphenol, 2,3-dimethylphenol, 2,4-dimethylphenol, 2,5-dimethylphenol, 2,6-dimethylphenol, 3,4-dimethylphenol, 3,5-dimethylphenol, o-ethylphenol, m-ethylphenol, p-ethylphenol, 2,3,4-trimethylphenol, 2,3,5-trimethylphenol, 3,4,5-trimethylphenol and mixtures thereof.

15. The glyoxal-phenolic condensate from glyoxal and phenolic compounds according to claim 11, wherein the glyoxal-phenolic condensate has an UV absorbance at 365 nm is at least 0.320 with a Mw range takes about 35% to about 50% of overall Gel-Permeation Chromatography (GPC) integrated area of Mw=274 to 630 at a detection wavelength of 254 nm or the UV absorbance at 350 nm is at least 0.550 with the Mw range takes about 35% to about 50% of GPC integrated area of Mw=274 to 630 at a detection wavelength of 254 nm.

16. A process of preparing glyoxal-phenolic condensates from glyoxal and phenol which comprise:

(a) condensing a mixture of condensates, from a molar ratio of glyoxal to phenol being about 0.11 to 0.15;

(b) adding at least one acid catalyst to the mixture in the presence of about 0.05% to 16% of glyoxal charged for condensation reactions and the a pKa value of at least one acid catalyst is not more than 1.0;

(c) obtaining glyoxal-phenolic condensates having a range of weight average molecular weight (Mw), calculated as polystyrene and phenol, wherein the range satisfies the expression, $1.3 \times [1 \times$(Molecular weight of aldehydes)$+2 \times$(Molecular weight of phenolic compounds)$-2$(Molecular weight of water)] to $1.5 \times [3 \times$(Molecular weight of aldehydes)$+3 \times$(Molecular weight of phenolic compounds)$-2 \times$(Molecular weight of water)]; the Mw range takes about 35% to about 50% of overall Gel-Permeation Chromatography (GPC) integrated area at a detection wavelength of 254 nm; and a Gardner Index is not more than 13.

17. The process of claim 16, wherein the acid catalyst is selected from the group consisting of p-Toluenesulfonic acid, oxalic acid, hydrochloric acid, sulfuric acid, phosphoric acid, trichloroacetic acid, acid-functional cationic exchange catalyst and their mixtures.

18. A flame retardant composition comprising an epoxy compound and based on each 100 parts of the epoxy compound comprises:

from about 2 to about 15 parts of the epoxy compound of claim 13; and, from 0 to about 98 parts of an epoxy resin selected from the group consisting of (i) a halogen-free epoxy resin, (ii) a bromine-containing epoxy resin, (iii) a phosphine-containing epoxy resin, and (iv) mixtures thereof.

19. A composite product comprising filler and a polymer matrix, wherein the polymer matrix comprises the glyoxal-phenolic condensates of claim 11.

20. A composite product comprising filler and a polymer matrix, wherein the polymer matrix comprises the epoxy compound is epoxidized from the glyoxal-phenolic condensates of claim 11.

* * * * *